United States Patent [19]
Rosenfeld

[11] 3,751,143
[45] Aug. 7, 1973

[54] SYNCHRONIZED SOUND AND PICTURE FILM RECORDING AND PROJECTION SYSTEM

[75] Inventor: Jon P. Rosenfeld, Arlington, Mass.

[73] Assignee: Massachusetts Institute of Technology, Cambridge, Mass.

[22] Filed: July 11, 1972

[21] Appl. No.: 270,772

[52] U.S. Cl. ................................................ 352/12
[51] Int. Cl. .......................................... G03b 31/00
[58] Field of Search .................... 352/5, 12, 19, 25, 352/26, 31

[56] References Cited
UNITED STATES PATENTS
3,049,965  8/1962  Gunst.................................... 352/5

Primary Examiner—Samuel S. Matthews
Assistant Examiner—Michael L. Gellner
Attorney—Arthur A. Smith, Jr. et al.

[57] ABSTRACT

A sound motion picture film system in which the motion picture camera and the sound recorder means are operated as independent physical entities during the picture taking and sound recording process. The camera is synchronized to produce a preselected frame rate, preferably at 24 frames per second, through appropriate self-containing synchronizing circuitry associated therewith. The sound is recorded on one track of a two-track magnetic tape the other track of which has a fixed frequency tone signal recorded thereon. The sound is re-recorded on sound film stock at the same frame rate as the picture film stock, the frame rate being controlled by self-contained synchronizing circuitry using the tone signal as a reference signal. The picture film stock and the sound film stock can then be played back using appropriate projector and sound playback means which are operated in synchronism via circuitry driven by the same a-c line source. Accordingly, no interconnecting cables carrying synchronizing signals are required between the sound recording equipment and the camera during the picture taking process.

19 Claims, 8 Drawing Figures

SYNCHRONIZED SOUND AND PICTURE FILM RECORDING AND PROJECTION SYSTEM

DISCLOSURE OF THE INVENTION

Introduction

This invention relates generally to film systems for producing synchronized sound and motion picture film recordings which can be appropriately projected for viewing and, more particularly, to such systems which use separate picture and sound recording apparatus and which can be effectively and economically adapted for use by amateur and semi-professional persons, groups or institutions.

BACKGROUND OF THE INVENTION

There has been an increasing interest in recent years in the art of sound motion picture film making, particularly in colleges and universities in which full time courses devoted to film making are being offered to a greater extent than ever before. Such interest among amateurs and those of a semi-professional status in the film making field has given rise to a need for film making systems which are sufficiently inexpensive to permit the purchase of one or several such systems, particularly for use by relatively large groups, the systems being sufficiently flexible in use to provide for potentially widespread experimentation in techniques by such users. The systems should at the same time provide a reasonably good quality of visual and sound reproduction at such reasonable costs.

In order to achieve a desired flexibility of use, such amateur and semi-professional film makers have found that the employment of dual systems, wherein separate sound and picture recording equipment is used, is more desirable than integrally packages sound and picture taking apparatus. In dual systems, the sound and picture information is not recorded on the same film stock. Usually, the picture is recorded on silent picture film stock and the sound is separately recorded on magnetic tape. In this way, a plurality of cameras and a plurality of sound recording units can be used at different locations during the filming process. Moreover, there is less bulk to each separate unit, thereby providing greater freedom for physical movement thereof on a portable basis.

In dual systems of this nature, it is mandatory that the operation thereof provide for a relatively high precision of synchronization of the sound and the picture. Moreover, in such synchronized systems, the purchase and operating costs thereof must be maintained within a range which amateurs and semi-professional individuals or groups can afford. As a part of the overall cost picture, it is preferable that the system be adapted to use good quality 8 mm. film, such as is generally referred to as Super 8 film, as opposed, for example, to 16 mm. systems where both the equipment costs and the film costs for operation are considerably greater.

DISCUSSION OF THE PRIOR ART

Some dual systems have been made available in the field at this time, their primary advantage being their relatively low purchase cost, in the range of less than $1,000, exclusive of the costs of any editing equipment which may be needed. However, such present day systems have sufficient problems as to limit their usefulness even to the interested amateur or semi-professional group. As mentioned above, the primary problem in using separate sound and picture recording equipment lies in synchronizing the operation of the camera and the sound recorder so that, when the separate film stock recordings have been made, they can be relatively easily edited and projected so as to produce a final, accurately synchronized film product. Present day Super-8 systems attempt to solve the synchronization problem by utilizing appropriate interconnecting cables between the camera and the sound recorder, by which cable connections suitable synchronization signals can be interconnected. The use of cable connections greatly restricts the flexibility and the physical portability of the system since the cables must be of some reasonably short length and persons carrying each unit must thereby remain in close physical proximity. Accordingly, the ability to place the cameras and the sound recorders at many different locations sometimes quite remote from each other, even if multiple sets of dual units are used, is severaly limited. Exemplary systems presently offered for sale are described, for example, in the magazine Consumer Reports of September 1971, pp. 550–553. The descriptions contained therein indicate the further difficulty in suitably editing the filmed product.

DESCRIPTION OF THE INVENTION

The system of the invention avoids the limitations of the prior art systems while at the same time providing a system at relatively reasonable costs for use by individuals or groups, such as college film making departments or other amateur or semi-professional groups interested in learning the art of film making for personal enjoyment or for commercial exploitation.

In the system of the invention the camera and the sound recorder units are completely separated, with no interconnecting cables required for synchronization purposes. The camera uses a battery-operated d-c motor and is equipped with a self-contained control circuit for controlling the picture frame rate, or shutter actuation rate, therein whereby the frame is maintained at a fixed frequency. Such control is obtained through the use of a quartz crystal oscillator from which a reference signal comprising a plurality of pulses having a desired repetition rate is derived and a frame rate sensing device from which a signal comprising a plurality of pulses having a repetition rate at the frame rate is derived. A pulsed control signal representing the phase difference between such pulse signals is produced, the pulse width of such control signal varying in accordance with such phase difference. The control signal effectively modulates a switching circuit which applies a d-c voltage to the d-c camera motor, the duty cycle thereof determining the motor speed in a manner such that the frame rate of operation is maintained at a desired fixed rate as, for example, to provide for picture taking at 24 frames per second.

The sound recorder used in the system of the invention includes a good quality battery-operated cassette recorder which utilizes a two-track magnetic tape. The desired sound signal is recorded on one of the two tracks, while a fixed frequency tone signal is simultaneously recorded on the other track. The sound signal is then re-recorded on magnetic coated sound film stock by means of an appropriate sound recording transfer machine, such as a high quality reel-type tape deck, which, for example, may use an a-c tape motor. The sound film stock speed during recording at the transfer machine is appropriately controlled by a comparison of a pulse train signal derived from the tone signal with a pulse train derived, for example, from the sprocket holes of the film stock and effectively representing the sound frame rate of the sound which is being re-recorded on the sound film stock. By such control the sound signal is re-recorded at a sound frame rate which bears a fixed, synchronized relationship with the frame rate of the picture film. To this end the control system for the transfer machine includes a phase comparator to compare pulse train signals derived from the tone signal and the film stock frame rate signal so as to produce an output voltage for controlling the frequency of a voltage controlled oscillator, the output of which is fed to a motor drive circuit for driving the motor of the transfer machine at the desired speed to produce the desired sound frame rate during the re-recording process. The sound signal is, thus, re-recorded on magnetic coated film stock so that, when the sound signal is reproduced simultaneously with the projection of the picture film stock, a synchronized relationship between them results. Since the picture film projector synchronous motor is driven by an a-c signal from a conventional a-c line source, the transfer machine control circuit as described above can also be used to control the operation of the transfer machine during playback of the sound in association with the picture projection by using an appropriate reference signal derived from the a-c line source as a reference input to the phase comparison circuit, as described in more detail below.

The system of the invention is described in more detail with reference to the accompanying drawings wherein.

Figures 1, 2, 2A:
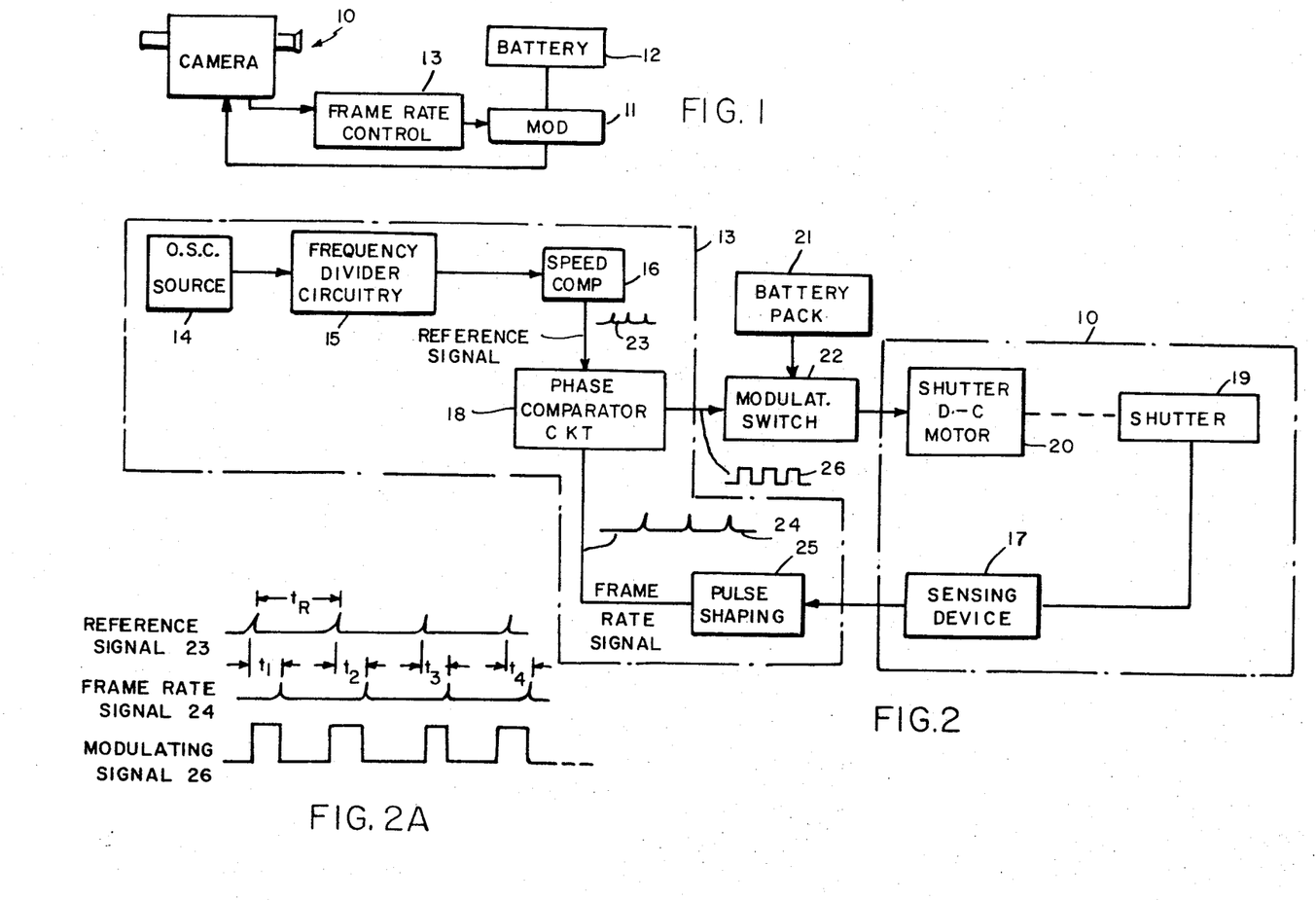
FIG. 1 shows a simplified block diagram of the camera unit of the invention.
FIG. 2 shows a more detailed diagram of the frequency control portion of the camera unit of FIG. 1.
FIG. 2A shows waveforms depicting signals present in the system of FIG. 2.

As seen in FIG. 1, a camera 10 of a portable, battery-operated type is used to record a silent motion picture on appropriate motion picture film stock, preferably of an 8 mm. size. The camera is selected to provide relatively good quality of picture recording, for use with Super-8 film, the camera being appropriately modified as discussed below for use in the system of the invention. One such camera which has been used for this purpose is the Model S-56 "Nizo" camera made by Braun AG, although the system is clearly not limited only to that particular camera. Any Super-8 silent camera employing a DC motor drive may be used.

As mentioned above, such cameras are normally battery-operated, as shown diagrammatically by battery pack 12, which provides a voltage for operating a d-c motor to drive the camera shutter. The battery pack may be integrally formed with the camera itself or it may be separately packaged for carrying about the waist or other part of the user, for example, with a cable interconnecting its output with the d-c motor in the camera. In either case, the camera, as used in the system of the invention, is modified by the utilization of a frame rate control circuit 13, the configuration and operation of which is discussed with reference to FIGS. 2 and 3. The frame rate control circuit provides a means 11 for modulating the application of the battery voltage to the d-c motor so as to control the speed of the d-c motor of the camera in order to maintain the frame rate at a substantially constant, preselected value. A common frame rate utilized for such purposes is, for example, one which provides 24 picture frames per second. The overall camera, battery and frame rate control circuit represents a separate, self-contained picture taking unit which requires no interconnections with the sound recording unit of the overall system of the invention, the latter being discussed below with reference to FIGS. 4 and 5.

The operation and configuration of the frame rate control circuit is shown in more detail in connection with FIG. 2 and includes an oscillator source 14, such as a quartz crystal oscillator, having a normal mode of oscillation at 3.84 MHz. The output of the quartz oscillator 14 is fed to appropriate frequency divider circuitry 15 of any well known configuration which can be fashioned, for example, on a plurality of integrated circuit chips. The frequency divider circuitry produces at its output a reference signal 23 in the form of a pulse train having a repetition rate which is a sub-multiple of the frequency of the signal from the oscillator source, in this case a repetition rate of 24 Hz, equal to the desired shutter frame rate of 24 frames per second. A speed compensating means 16 for inhibiting the operation of the control circuitry until the motor reaches a preselected speed near the desired speed thereof is also used in conjunction with the reference signal circuit, as explained more fully below.

The system also provides means for obtaining a frame rate signal, which can include, for example, an appropriate sensing device 17 and pulse shaping circuitry 25 used to generate a pulse train signal 24, the repetition rate of which in one embodiment is effectively representative of the rate of actuation of the shutter 19 of the camera 10. While it is possible to utilize various sensing mechanisms for this purpose, the "Nizo" camera mentioned above, for example, provides an internally located pair of contacts on the camera which effectively open and close in accordance with the opening and closing of the camera shutter. Such contacts can be externally connected to the pulse shaping circuitry 25 to produce the required pulse train signal output. Other means known in the art for sensing the camera frame rate also may be used for this purpose.

The reference pulse train signal and the frame rate pulse train signal 24 are each fed to a phase comparator circuit 18. As can be seen in FIG. 2A the reference signal 23 has a constant repetition rate, i.e., the time $t_r$ between pulses is the same. On the other hand, the frame rate signal does not necessarily have a constant repetition rate and the time between pulses may vary, as shown. It is desirable to maintain a constant frame rate, such rate to be the same as that of reference signal 23.

Accordingly, the signals 23 and 24 are fed to a phase comparator circuit which measures the time difference between the pulses of signal 23 and those of signal 24 (e.g., represented by the times $t_1, t_2, t_3, t_4$ ... etc.) to produce an output pulse modulating signal 26 having varying pulse widths in accordance with such varying time differences. Such modulating signal is then fed to a suitable electronic switching device 22 to which the output from battery pack 21 is also connected, the modulating switch circuitry thereby applying the battery pack d-c voltage to the shutter d-c motor 20 in camera 10. The duty cycle of the battery pack 21 varies in accordance with modulating signal 26 so that the shutter motor and, hence, the shutter actuation rate (i.e., frame rate) is maintained at the desired value. When the shutter actuation rate is equal to the reference signal repetition rate the duty cycle of the battery is constant and the motor is held at the correct speed.

Figure 3:
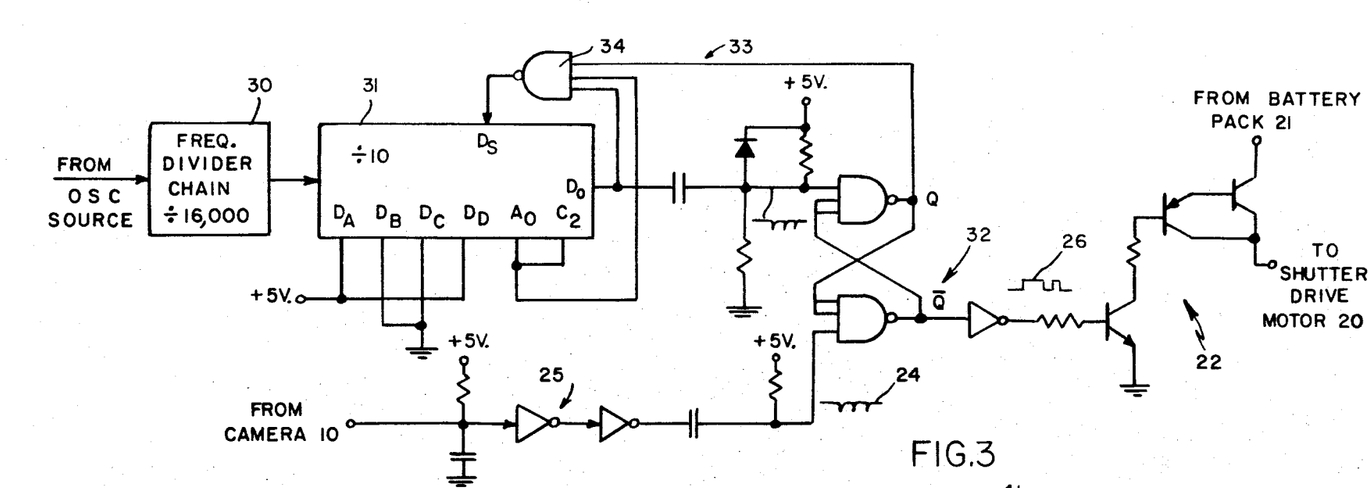
FIG. 3 shows a more detailed circuit diagram of the control portion of the camera unit of FIG. 2.

Specific exemplary circuitry for implementing the system of FIG. 2 is shown in FIG. 3. As can be seen, the frequency divider circuitry 30 can be arranged to divide the frequency of the input signal (of 3.84 MHz) from oscillator source 14 by 16,000 to provide an output signal of 240 Hz. Such circuitry can be in the form of a plurality of integrated circuit chips, three of which are, for example, used successively to divide the frequency by 10 and a fourth of which divides by 16. Such chips are readily available in the art as, for example, chips having Models Nos. 8292 and 8293, respectively, as made and sold by Signetics. A final division by 10 is achieved in an integrated circuit chip 31 which is in effect a decade counter circuit and provides at each decade count an output signal at terminal $D_o$ which, when differentiated, produces the pulse train signal 23 as shown.

The frame rate pulse train signal 24 is produced by the signal from camera 10 at the output of pulse shaping circuitry 25. The phase comparator circuitry 18 utilizes a flip flop circuit 32 comprising a pair of "nand" gates and an amplifier as shown, to produce the modulating signal 26 at the output of the amplifier which signal is used as the input signal to modulating switch circuitry 22 for controlling the duty cycle of battery pack 21, the voltage from which is fed to shutter drive motor 20. In effect the circuitry of FIG. 3 operates as a phase locked loop during operation so as to maintain the motor at the desired speed.

For correct operation of the phase locked loop circuitry of FIG. 3 it is necessary that the camera motor speed be at or near its correct operating speed. Thus, it is necessary to bring the camera up to a speed close to the desired 24 frames per second before "engaging" the phase locked loop circuit and, for this purpose, the circuitry of FIG. 3 provides for such under speed operation. In effect a comparison is made between the time period of the pulse from the decade counter 31 and the pulse from camera 10. If the latter is longer than the former power is delivered to the motor effectively continuously until the motor is up to speed.

In accordance with such operation, when decade counter 31 makes its transition from its 9 count to its zero count, the Q output from flip flop circuitry 32 is 1 and the motor is supplied power. If the motor is up to speed, a pulse from the camera motor will occur at some time before the decade counter reaches its next 9 count and will reset the Q output to 0 so that power to the motor is shut off. However, if the motor is running too slow, no motor pulse will occur before the decade counter reaches its 9 count. Since the Q output thereby remains at 1 and the $A_o$ and $D_o$ outputs are each 1 at the 9 count, the output of "nand" gate 34 produces a 0 output at $D_s$ so that the decade counter then remains at its 9 count, and power continues to be supplied to the motor. As soon as the next pulse from camera 10 occurs, the flip flop circuit is reset so that its Q output returns to 0 which causes a 1 output from "nand" gate 34 at $D_s$ to permit the counter to return to zero and begin its count once more. At that time the output $D_o$ is at 0 and the Q output of flip flop circuit 32 accordingly is promptly set back to 1 again so that power is promptly supplied to the motor. In effect, then, so long as the camera motor is below speed, power is delivered nearly continuously to the motor. When the motor reaches its desired speed and the pulses from camera 10 occur during each decade counting period of counter 31, the phase locked loop is effectively "locked in" and control of the camera motor proceeds as described previously.

Thus, the speed of the camera drive is standardized to achieve the desired synchronized operation even if the battery voltage changes as, for example, when the battery is discharged. The control of the d-c motor speed through the frame rate control circuit 13, as shown in FIGS. 1-3, thereby provides more precise control for this purpose than mere dependence upon the mechanical governor which is usually provided by the camera manufacturer to stabilize the speed of cameras of this type. The governor obviously only prevents the shutter from being actuated at a rate above a selected value but cannot maintain the frame rate at a controlled constant value. Further, the system of the invention differs from frame rate control circuits which are now used in connection with more expensive 16 mm. cameras which, while they often employ a crystal frequency oscillator, or other frequency stabilizing means, usually control the camera frame rate by driving a synchronous a-c motor through an amplifier at a desired frequency without any corrective comparison circuitry. In contrast, in the system described with reference to FIGS. 1-3 it can be seen that in effect only a differential power control is used to control a d-c motor, such motors being more compact and having better torque characteristics than the a-c synchronous motors used with 16 mm. camera units.

Figure 4:
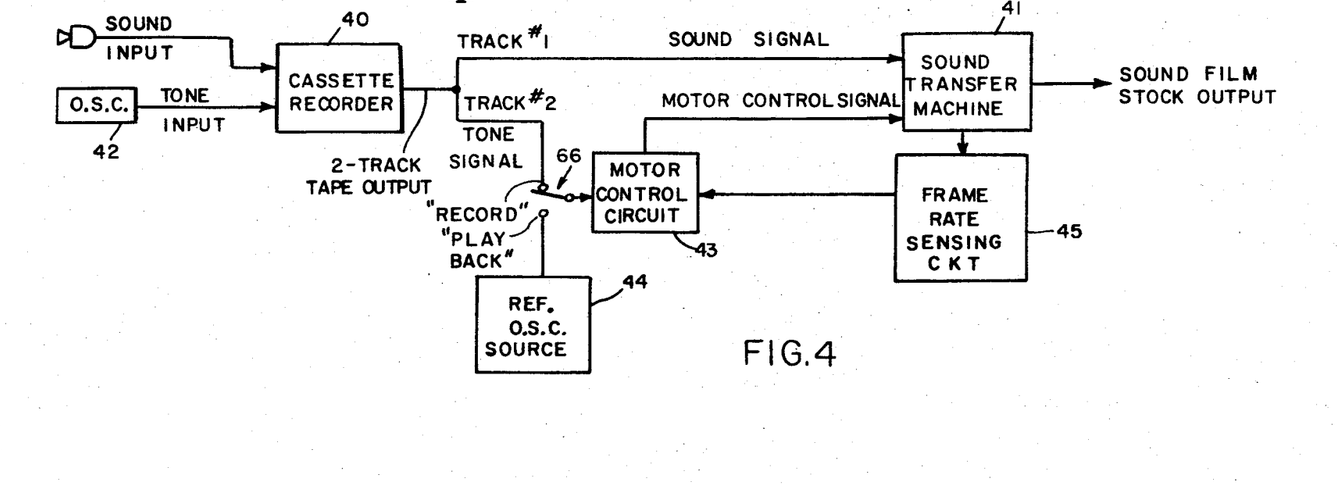
FIG. 4 shows a simplified block diagram of the sound recording and sound transfer units of the invention.
Figure 5:
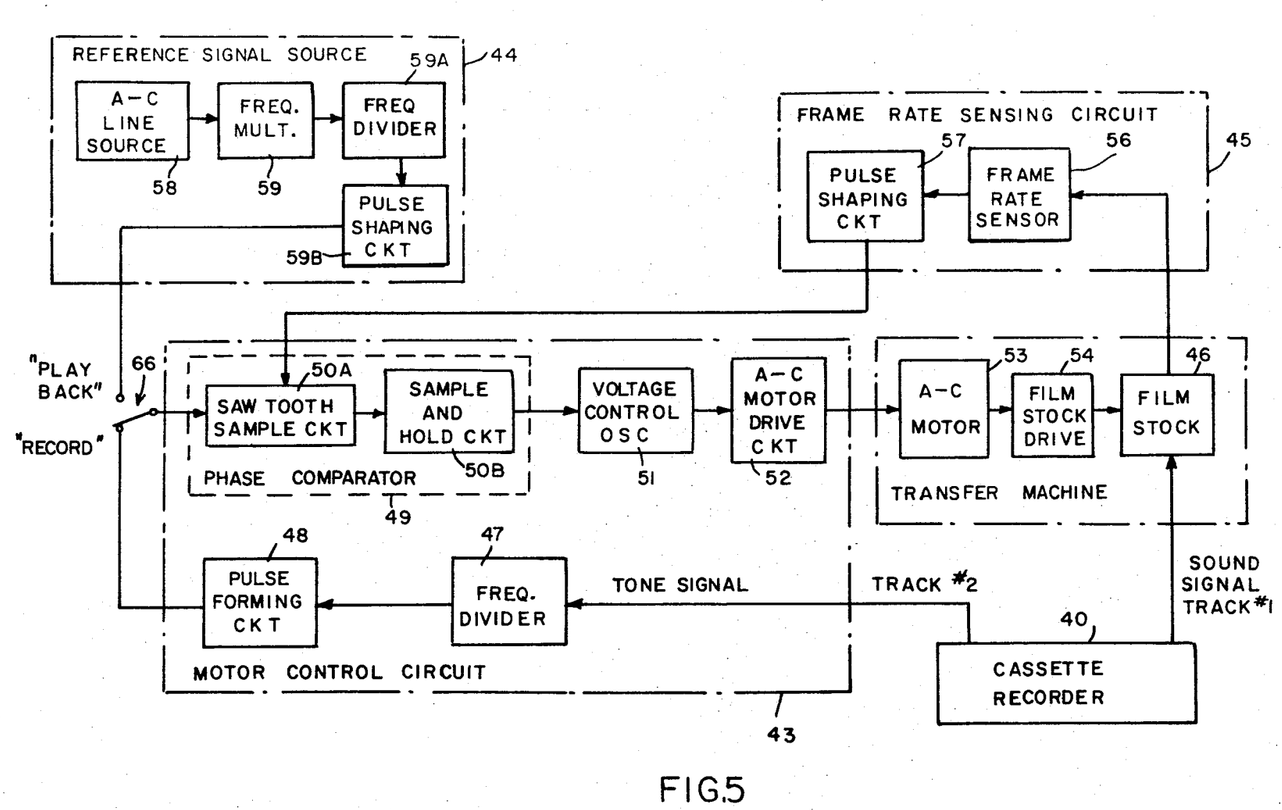
FIG. 5 shows a more detailed block diagram of the units of FIG. 2.

FIGS. 4 and 5 depict the overall sound recording subsystem of the system of the invention, which includes a cassette recorder 40 and a sound recording transfer machine 41, the latter being used for re-recording on magnetic coated film stock the sound originally recorded on the cassette tape. The overall re-recording of the cassette sound signal must be performed at a standardized speed, or sound frame rate, in synchronous relationship with the picture frame rate of the camera, as discussed above. As shown in FIG. 4, the cassette recorder utilizes a two track magnetic tape, on one track of which the desired sound input signal is recorded and on the other track of which a tone signal having a preselected frequency as obtained from an oscillator source 42 is recorded. The cassette recorder may be of any reasonably good quality, one exemplary unit found suitable being the Model TC-124 made by Sony Corporation of Japan.

The cassette recorded sound signal is then fed to an appropriate sound transfer machine unit 41 which, for example, may be a reel-type tape deck unit, an exemplary unit found suitable being Model TC-650 tape deck made by Sony Corporation of Japan, which tape deck is modified so as to be used for recording on magnetic-coated Super 8 mm. sprocketed film stock, as opposed to conventional magnetic recording tape normally used in such a machine. In order to achieve synchronous operation with the picture film recording, the frame rate of the sound film stock used in the re-recording process at the sound transfer machine 41 is synchronized to the frequency of the tone signal on the cassette tape on which the sound has been originally recorded. The speed of the film stock a-c drive motor is appropriately controlled during the re-recording process through appropriate motor control circuitry 43 which provides an output a-c voltage for actuating the transfer machine a-c motor which drives the magnetic coated sound film stock. FIG. 5 shows in more detail the motor control circuitry and, as can be seen therein, the sound subsystem utilizes a form of phase comparator process which produces a d-c voltage proportional to the phase difference of the input signals, as explained more fully below.

As can be seen diagrammatically therein, during the re-recording mode, the sound signal originally recorded on one track of the tape of cassette recorder 40 is fed therefrom to the transfer machine 41 for recording on magnetic coated film stock 46. The tone signal (having a frequency of 240 Hz, for example) recorded on the other track thereof is fed to frequency divider circuitry 47 which produces a signal at 24 Hz, which signal is converted into a reference pulse train signal through appropriate pulse forming circuitry 48. The reference signal is fed to phase comparator circuitry 49 through a switch 66 placed in the "Record" position, as shown.

The speed of the magnetic coated film stock 46 is suitably measured by a frame rate sensor 56 which may be, for example, a lamp/photocell circuit which is disposed in appropriate relationship with the sprocket holes of the film stock to produce a pulse output signal having a repetition rate equal to the frame rate of the film stock as it is driven by an appropriate drive mechanism 54 via a-c motor 53. The pulsed output from sensing circuitry 56 is then suitably shaped by pulse shaping circuitry 57 to produce a train of pulses for feeding to the phase comparator 49.

Phase comparator circuitry 49 includes saw tooth/sample circuitry 50A for converting one of the moving pulse train signals to a saw tooth voltage signal, the other pulse train signal being used to sample the voltage level of the saw tooth signal. Thus, if the reference pulse train signal is converted to a saw tooth voltage signal, for example, the incoming pulses from the frame rate signal are then used to sample at their time of arrival the level of the saw tooth voltage signal, which level is effectively proportional to the phase (i.e., time) differences between the input pulse train signals. The sampled voltage level is then maintained at the sampled level by a suitable sample and hold circuit 50B until the next sample. Thus, the output of the sample and hold circuit is a slowly varying d-c voltage representative of the phase differences between the input pulse train signal, as desired. Suitable implementation of the saw tooth/sample and sample and hold circuitry will be known to those in the art and, accordingly, need not be further described in detail here.

The voltage from sample and hold circuit 50B is used to control a voltage controlled oscillator 51 which in turn controls an a-c motor drive circuit 52 for actuating the a-c motor 53 of the sound transfer machine 41. If the frame rate of the sound tape film stock 46 is the same as the repetition rate of the tone signal, the phase difference therebetween is constant and the a-c control voltage fed to the motor is such as to maintain the film stock speed at the desired correct value. If the frame rate of the film stock increases or decreases, the control voltage changes accordingly to restore the frame rate to its desired value.

Figures 6, 7:
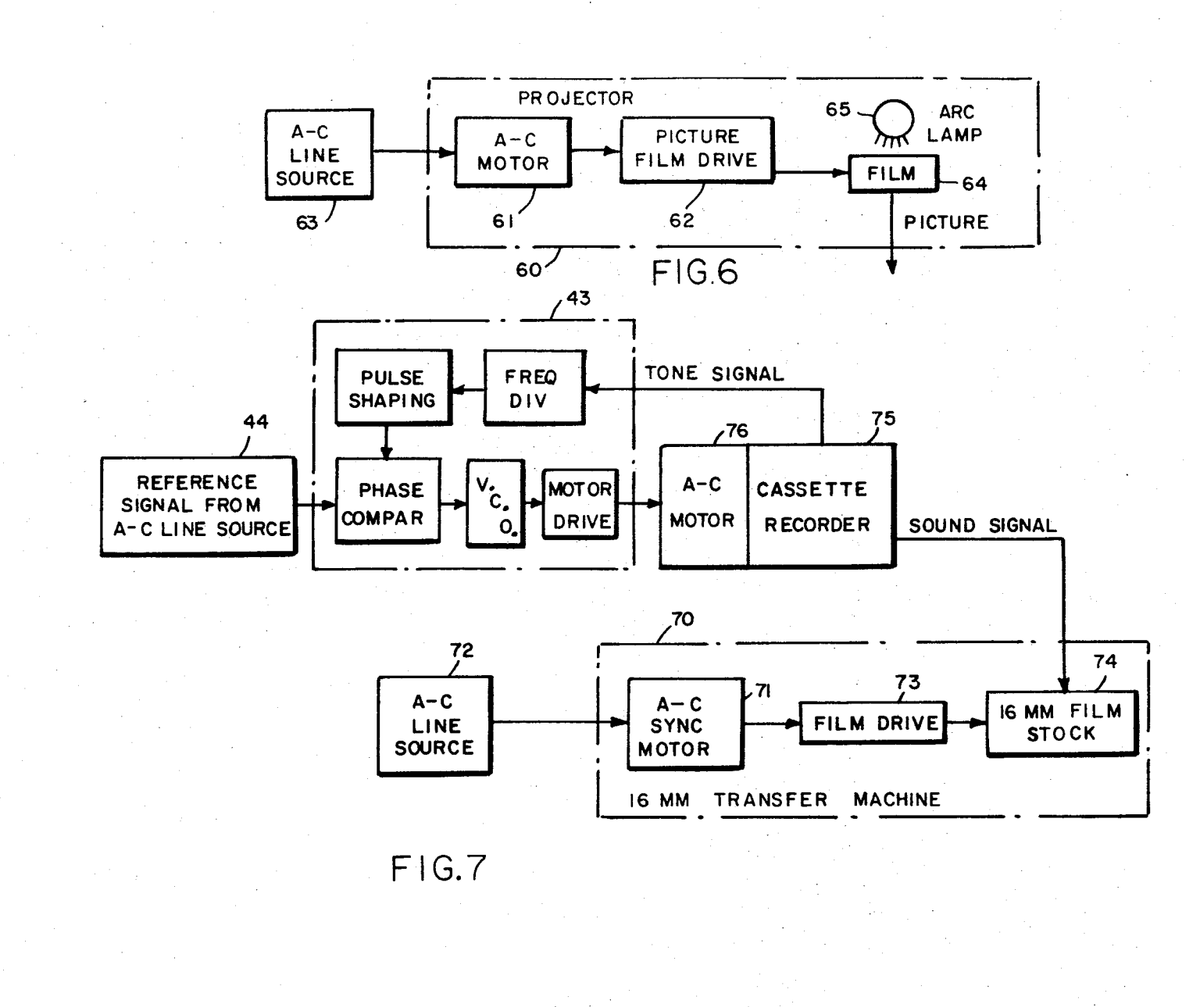
FIG. 6 shows a simplified block diagram of the projector unit of the invention.
FIG. 7 shows a block diagram of the sound recording portion of the system of the invention for recording on 16 mm. film stock.

The overall sound recording subsystem thereby results in a re-recording of the sound signal channel of the cassette recorder at the desired speed on magnetic coated film stock for future use in synchronism with the picture film. Once the recording of the picture and the sound have each been made separately on appropriate picture and magnetic coated film stock, respectively, the picture film can be projected on a suitable projector 60, as shown diagrammatically in FIG. 6, simultaneously with the playback of the magnetic film stock on the sound transfer machine 41. For this purpose, a Model FP-5 projector made by Braun AG has been found acceptable for use in the system with minor modifications. In one embodiment thereof the projector has been fitted with an a-c synchronous motor 61 which is connected to a conventional a-c line source 63 and actuates the film drive mechanism 62 to drive the film stock 64. Further, in order to provide high brightness of the projected film picture, it is often desirable to modify the projector so as to utilize a higher powered projector lamp than might be normally available in equipment of that type. Thus, a quartz arc lamp 65 of up to 300 watts may be utilized in the projector as shown in FIG. 6.

In using the sound transfer machine in its playback mode in conjunction with projector 60 for projecting the completed film, it is necessary that the sound frame rate of the sound film stock at the transfer machine be in synchronism with the picture frame rate of the picture film stock at the projector. Such synchronized operation is provided by utilizing the control system of FIG. 5 as discussed in connection with the re-recording of the sound on to the sound film stock. In the playback mode, the switch 66 is placed in the "Play Back" position so as to connect the output from a reference signal source 44 to phase comparator 49 in place of the reference tone signal used in the "Record" mode as described above.

The reference source 44 includes a frequency multiplier circuit 59 connected to a conventional a-c line source 58 for providing a signal, for example, having a frequency of 120 Hz, i.e., twice the line frequency of 60 Hz. A frequency divider circuit 59A, through appropriate division by five, provides a 24 Hz reference signal which, since both are derived from the same line source, is in synchronism with the picture film frame rate of 24 frames per second. A suitable pulse shaping circuit 59B is also used to provide the desired pulse signals for feeding to phase comparator 49. So long as the tape is driven at the same synchronous rate, the phase difference between the sound frame rate and the reference signal from source 44 is constant and the a-c motor 53 is being driven at the correct speed. Correction of such speed then automatically occurs if the motor speed varies in the manner discussed above with reference to the "Record" mode.

Although the system discussed above is shown as used with Super-8 mm. picture and sound film stock, it is not limited to 8 mm. film stock but can also be adapted for use with 16 mm. film stock if desired. Thus, a conventional 16 mm. camera together with an appropriate 16 mm. recording transfer machine such as, for example, one presently available from Magnatech Corporation may be used. The latter uses a synchronous a-c motor driven by the a-c line frequency source as discussed above with reference to the projector 60. In re-recording the sound on the 16 mm. machine, the cassette tape on which the sound is originally recorded must be played back on a cassette recorder driven by an a-c motor, such as that which drives the film stock of the transfer machine 41 of FIG. 5. Accordingly, the motor control system 43 of FIG. 5 can be used to control the a-c motor of the cassette recorder, as shown in FIG. 7. As depicted therein, the 16 mm. transfer machine 70 uses an a-c synchronous motor 71 driven from a-c line source 72 to actuate the film stock drive mechanism 73 for driving the 16 mm. film stock 74. A cassette recorder 75 which is driven by an a-c motor 76 is used to play back the originally recorded two-track tape, one track of which feeds the sound signal to the film stock 74 and the other track of which supplies the tone signal as before. Thus, in this application, a pulse train signal derived from the tone signal and a reference pulse train signal derived from the line signal via signal source 44 are fed to the phase comparator, voltage controlled oscillator, and a-c motor drive circuit to produce the desired control signal for the a-c motor 76 of the cassette recorder 75.

What is claimed is:
1. A sound and motion picture recording system comprising
   picture recording means including
      a camera and a motor for actuating the shutter thereof;
   means for actuating said camera motor;
   camera motor control means including
      means for producing a plurality of reference pulses at a fixed repetition rate;
      means for producing a plurality of sensing pulses having a repetition rate representative of the frame rate of said camera;
      means responsive to said reference pulses and to said sensing pulses for controlling the operation of said camera motor actuating means so as to maintain the speed of said motor at a substantially constant value to provide a preselected frame rate for said camera;
   sound recording means being separately operable from said camera and including
   means for producing a tone signal having a preselected fixed frequency;
   tape recording means responsive to a sound signal and to said tone signal for simultaneously recording said signals on separate tape tracks;
   recording transfer means for re-recording said sound signal on a magnetic coated sound film stock when said transfer means is in its recording mode of operation, said transfer means including
   transfer motor means for driving said sound film stock;
   means for actuating said transfer motor means;
   transfer motor control means arranged for operation independently of said camera motor control means, said transfer motor control means including
      means responsive to said tone signal for producing a plurality of tone reference pulses at a repetition rate equal to the preselected frame rate for said camera;
      means for producing a plurality of film stock frame rate sensing pulses having a repetition rate representative of the frame rate of said sound film stock;
      means responsive to said tone reference pulses and to said film stock frame rate sensing pulses for controlling the operation of said transfer motor actuating means so as to maintain the speed of said transfer motor at a substantially constant value to provide a sound film stock frame rate equal to said preselected frame rate for said camera.

2. A sound and motion picture recording system in accordance with claim 1 wherein
   said camera motor actuating means includes a voltage source;
   said means for controlling the operation of said camera motor actuating means includes
      means for comparing the phase differences between said reference pulses and said sensing pulses to produce a modulating signal; and
      means responsive to said modulating signal for applying the voltage from said voltage source to said camera motor in accordance with said modulating characteristics.

3. A sound and motion picture recording system in accordance with claim 2 wherein said reference pulse producing means includes
   a pulse oscillator means for producing a plurality of first pulses having a preselected repetition rate; and
   frequency divider means responsive to said plurality of first pulses for producing a plurality of reference pulses having a fixed preselected repetition rate less than that of said first pulses.

4. A sound and motion picture recording system in accordance with claim 3 wherein said reference pulse producing means further includes
   means for applying said camera motor actuating voltage to said camera motor substantially continuously until the speed of said camera motor reaches a value approximately equal to said constant value.

5. A sound and motion picture recording system in accordance with claim 4 wherein said sensing pulse producing means includes
   means for sensing the frame rate of said camera to produce a plurality of pulses representative thereof; and
   pulse shaping means responsive to said plurality of pulses for shaping said plurality of pulses to produce said sensing pulses.

6. A sound and motion picture recording system in accordance with claim 2 wherein said means for controlling said camera motor actuating means further includes
   means for measuring the time differences between each successive reference pulse and its corresponding successive sensing pulse to produce a pulsed modulating signal, the widths of the pulses of said pulsed modulating signal varying in accordance with said time differences.

7. A sound and motion picture recording system in accordance with claim 6 wherein said voltage applying means is a modulated switch actuated by said modulating signal whereby said switch applies the voltage from said voltage source to said camera motor for time periods corresponding to the widths of said pulses of said modulating signal.

8. A sound and motion picture recording system in accordance with claim 3 wherein the repetition rate of said reference pulses is preselected to be fixed at 24 pulses per second whereby the desired frame rate for said camera is 24 frames per second.

9. A sound and motion picture recording system in accordance with claim 8 wherein said pulse oscillator means produces pulses at a preselected repetition rate of 3.84 MHz and said frequency divider divides said repetition rate by 16,000 to produce said reference pulses at said repetition rate of 24 pulses per second.

10. A sound and motion picture recording system in accordance with claim 1 wherein said tape recording means is a cassette tape recorder utilizing sound magnetic tapes having at least two tracks.

11. A sound and motion picture recording system in accordance with claim 10 wherein said tone reference pulse producing means includes
frequency divider means responsive to said tone signal for producing a tone reference signal having a lower frequency than said tone signal; and
a pulse shaping circuit responsive to said tone reference signal for producing said plurality of tone reference pulses.

12. A sound and motion picture recording system in accordance with claim 11 wherein said film stock frame rate pulse producing means includes
sensing means for sensing the frame rate at which said film stock is being driven to produce a plurality of pulses representative of said film stock frame rate; and
a pulse shaping circuit responsive to said plurality of pulses for shaping said plurality of pulses to produce said frame rate sensing pulses.

13. A sound and motion picture recording system in accordance with claim 12 wherein said means for controlling said transfer motor actuating means includes
means for comparing the time differences between each successive tone reference pulse and its corresponding successive frame rate sensing pulse to produce a slowly varying voltage signal the levels of which vary in accordance with said time differences.

14. A sound and motion picture recording system in accordance with claim 13 wherein said comparing means includes
means responsive to one of said tone reference pulse signals and said frame rate sensing pulse signal to produce a saw tooth wave;
means for sampling the level of said saw tooth signal at the time occurrence of the other of said tone reference pulse signal and said frame rate sensing pulse signal to produce a sampled voltage level signal;
sample and hold circuitry responsive to said sampled voltage level signal for producing said slowly varying voltage signal, the level of which changes in accordance with the said sampled voltage level.

15. A sound and motion picture recording system in accordance with claim 14 wherein said saw tooth wave producing means is responsive to said tone reference pulse signal and said sampling means is responsive to said frame rate sensing pulse signal.

16. A sound and motion picture recording system in accordance with claim 15 and further including
a voltage controlled oscillator responsive to said slowly varying voltage signal to produce an oscillator drive signal, the frequency of which varies in accordance with said slowly varying voltage.

17. A sound and motion picture recording system in accordance with claim 16 wherein said transfer motor is an a-c motor and further wherein said transfer means further includes an a-c motor drive circuit responsive to said oscillator drive signal for applying a slowly varying a-c signal to said transfer motor.

18. A sound and motion picture projection system for projecting a motion picture and a sound signal recorded by the sound and motion picture recording system of claim 1, said projection system comprising
a silent motion picture projector having an a-c motor for driving the motion picture film stock on which said motion picture is recorded;
means for connecting said a-c motor to an a-c line source whereby said film stock is driven at a preselected fixed frame rate;
means for placing said recording transfer means into a playback mode of operation;
means for producing a plurality of playback reference pulses having a preselected repetition rate;
said means controlling said transfer motor actuating means being responsive to said plurality of playback reference pulses and to said plurality of sound frame rate sensing pulses so as to maintain said transfer motor speed at a substantially constant value;
whereby in said playback mode said sound film stock tape is driven at a frame rate which is synchronized with the preselected fixed frame rate at which said motion picture film stock is driven by said projector.

19. A sound and motion picture recording system in accordance with claim 18 wherein said playback reference pulse producing means includes frequency changing means responsive to said a-c line source for producing an oscillating signal at a preselected frequency equal to the preselected motion picture frame rate; and
pulse shaping means responsive to said oscillating signal for producing said playback reference pulses at a repetition rate equal to said preselected projector frame rate.

* * * * *